(12) United States Patent
Morse et al.

(10) Patent No.: US 12,158,955 B1
(45) Date of Patent: Dec. 3, 2024

(54) APPARATUS AND METHOD FOR MODIFICATION OF OPERATING ENVIRONMENTS

(71) Applicant: Parry Labs, LLC, Alexandria, VA (US)

(72) Inventors: David Morse, Alexandria, VA (US); David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/443,657

(22) Filed: Feb. 16, 2024

(51) Int. Cl.
*G06F 21/57* (2013.01)
*G06F 21/60* (2013.01)

(52) U.S. Cl.
CPC .......... *G06F 21/572* (2013.01); *G06F 21/602* (2013.01)

(58) Field of Classification Search
CPC .............................. G06F 21/572; G06F 21/602
See application file for complete search history.

(56) References Cited

U.S. PATENT DOCUMENTS

| | | | | |
|---|---|---|---|---|
| 10,664,574 | B1* | 5/2020 | Powers | G06F 21/6218 |
| 10,684,844 | B2* | 6/2020 | Compton | G06F 8/65 |
| 11,122,090 | B2* | 9/2021 | Verma | G06F 21/44 |
| 11,146,631 | B1* | 10/2021 | Shiau | G06F 8/60 |
| 11,295,017 | B2* | 4/2022 | Madrid | H04W 12/106 |
| 2008/0244089 | A1* | 10/2008 | Yarvis | H04L 67/06 709/242 |
| 2013/0318357 | A1* | 11/2013 | Abraham | G06F 21/64 713/168 |
| 2019/0188394 | A1* | 6/2019 | Aissi | G06F 21/604 |
| 2019/0289491 | A1* | 9/2019 | Haraguchi | H04L 47/25 |
| 2020/0084105 | A1* | 3/2020 | Hajost | H04L 41/082 |
| 2020/0310779 | A1* | 10/2020 | Van Heuklon | G06F 8/65 |
| 2022/0374221 | A1* | 11/2022 | Sayyed | G06F 21/572 |
| 2023/0297370 | A1* | 9/2023 | Giles | G06F 11/3688 717/121 |

FOREIGN PATENT DOCUMENTS

| | | | |
|---|---|---|---|
| CN | 115098890 A | * | 9/2022 |
| CN | 117319992 A | | 12/2023 |
| FR | 3107777 A1 | | 12/2022 |

* cited by examiner

*Primary Examiner* — Daxin Wu
(74) *Attorney, Agent, or Firm* — Caldwell Intellectual Property Law

(57) ABSTRACT

An apparatus for modification of operating environments, includes at least a processor and a memory communicatively connected to the at least a processor, the memory containing instructions configuring the processor to generate update data for one or more operating environments, append a digital signature associated with an update data source to the update data, identify at least one operating environment for receipt of the update data, wherein identification includes determining a compliance of one or more operating environments and identifying the at least one operating environment as a function of the compliance, authenticate the at least one operating environment, wherein authentication includes receiving an update log associated with the at least one operating environment and comparing the update log to a central log and transmit the update data to the at least one operating environment as a function of the authentication to modify the at least one operating environment.

18 Claims, 6 Drawing Sheets

APPARATUS AND METHOD FOR MODIFICATION OF OPERATING ENVIRONMENTS

FIELD OF THE INVENTION

The present invention generally relates to the field of virtual environments. In particular, the present invention is directed to an apparatus for modification of operating environments.

BACKGROUND

Virtual environments may be susceptible to modification or alteration without the consent or knowledge of the user. Current systems or operating environments that utilize military or aviation software require various security measures to ensure that virtual environments have not been modified without consent. Current systems or methods used to modify virtual environments do not provide an adequate level of security to ensure the safety and integrity of the virtual environments.

SUMMARY OF THE DISCLOSURE

In an aspect an apparatus for modification of operating environments is described. The apparatus includes at least a processor and a memory communicatively connected to at least a processor and operating system. The memory containing instructions configuring the processor to generate update data for one or more operating environments, append a digital signature associated with an update data source to the update data and identify at least one operating environment for receipt of the update data, wherein identification includes determining a compliance of one or more operating environments and identifying the at least one operating environment as a function of the compliance. The memory further contains instructions to authenticate the at least one operating environment, wherein authentication includes receiving an update log associated with the at least one operating environment and comparing the update log to a central log and transmit the update data to the at least one operating environment as a function of the authentication to modify the at least one operating environment.

In another aspect a method for modification of operating environments is described. The method incudes generating, by at least a processor, update data for one or more operating environments, appending, by the at least a processor, a digital signature associated with an update data source to the update data and identifying, by the at least a processor, at least one operating environment for receipt of the update data, wherein identification includes determining a compliance of one or more operating environments and identifying the at least one operating environment as a function of the company. The method further includes authenticating, by the at least a processor, the at least one operating environment, wherein authentication comprises receiving an update log associated with the at least one operating environment and comparing the update log to a central log and transmitting, by the at least a processor, the update data to the at least one operating environment as a function of the communication to modify the at least one operating environment These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
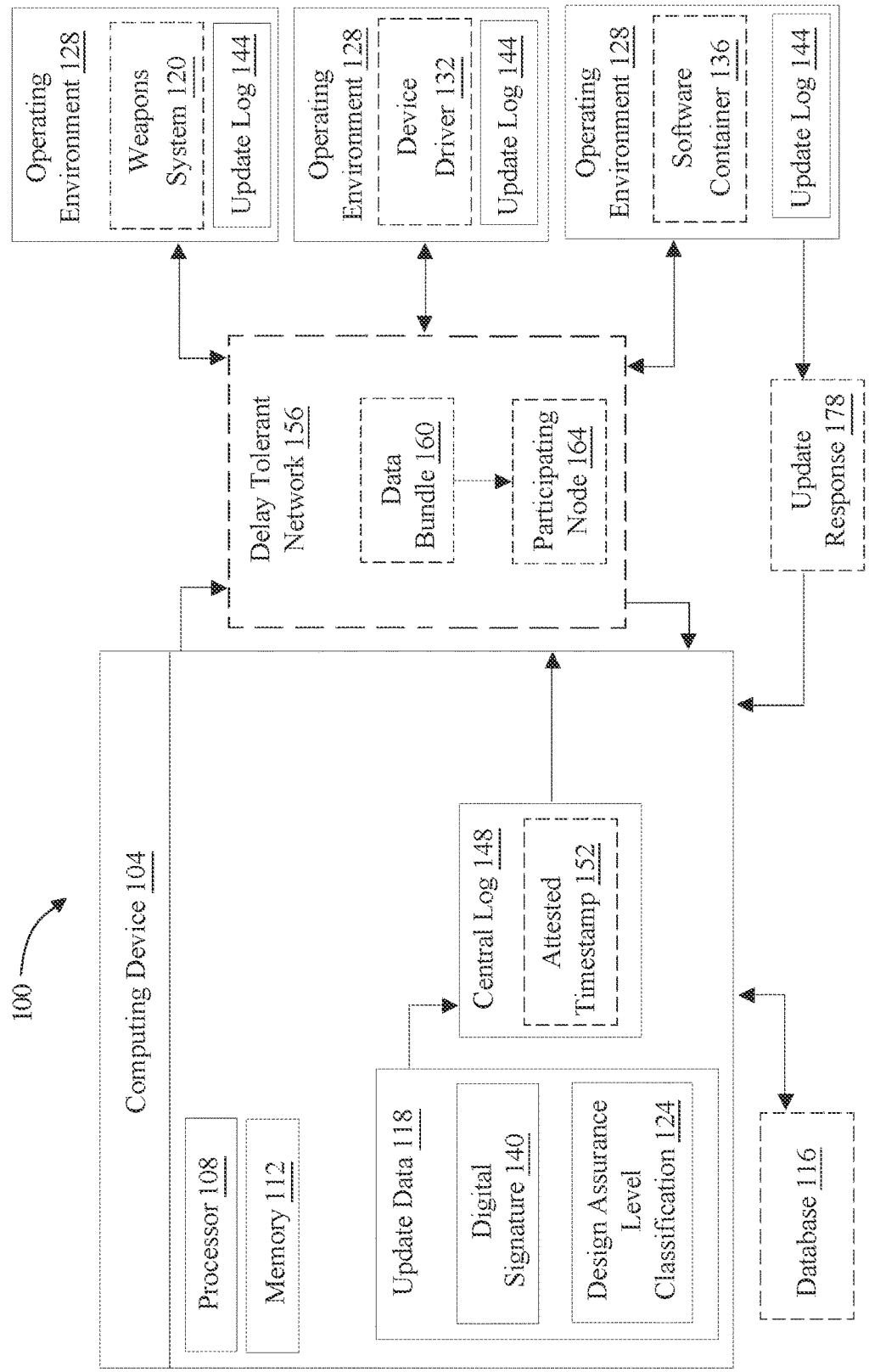
FIG. 1 is a block diagram illustration an exemplary embodiment of an apparatus for modification of operating environments.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for modification of operating environments. In an embodiment, apparatus includes a computing device configured to append digital signature to update data to ensure proper receipt of update data. In an embodiment, computing device may be configured to identify operating environment suitable for receipt of update data using Design assurance level classifications and update history.

Aspects of the present disclosure can be used to ensure proper receipt of software updates. Aspects of the present disclosure can also be used to determine the authenticity or security of a software prior to receipt of an update. This is so, at least in part due to one or more identification and/or authentication processes as described below.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=–R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Referring now to FIG. 1, an apparatus 100 for modification of operating environments is described. Apparatus 100 includes a computing device 104. Apparatus 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, Apparatus 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, apparatus 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or more embodiments, host circuit may carry out one or more processes as described in this disclosure intended for computing device 104.

With continued reference to FIG. 1, in or more embodiments, apparatus 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, apparatus 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, processor 108 is configured to receive update data 118. "Update data" for the purposes of this disclosure is information used to modify, enhance, correct, or otherwise alter an operation, functionality, feature, or performance of an existing computer software computer application, firmware, or hardware component within a designated operating environment. For example, and without limitation, update data 118 may include an instruction or a set of instructions to add additional code to a software, to add additional features to a software, instructions to remove a software bug and the like. In one or more embodiments, update data 118 may include information such as but not limited to, additional software capabilities, additional system requirements, changes to one or more processes within a system, changes to the visual design of a system, changes to the user interface of a system and the like. In one or more embodiments, update data 118 may be used to correct instructions and/or code on a software, to modify the capability of a software and the like. In one or more embodiments, update data 118 may include information associated with the software that is to be modified. This may include but is not limited to, the name of the software, compatibility information, system requirements, the date in which update data 118 was generated for the software, the version number of update data 118, information indicating potential changes to the software, information indicating additions to the software and the like. In one or more embodiments update data 118 may include modifications to a weapons system 120 such as but not limited to, guided missile systems, smart bombs, automated defense systems, unmanned aerial vehicles, threat identification systems, Artificial intelligent algorithms, weapons, operational flight programs and the like. In one or more embodiments, update data 118 may include modifications to an operating system, modifications to an operating system used for aviation, modifications to an aviation system, modifications to aircraft systems and the like. In one or more embodiments update data 118 may include patches to a system or software. A "patch" for the purposes of this disclosure is a set of instructions or code designed to fix specific issues or to improve issues within an existing system. In one or more embodiments, patches may include instructions to modify a code with a faulty system, instructions to make one or more processes more efficient, modifications to security vulnerabilities within a system, modifications to faulty code and the like. In one or more embodiments, patches may be used to address existing issues within a system in order to repair the existing issues.

With continued reference to FIG. 1, update data 118 may include a design level classification. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification 124 may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, update data 118 may contain a DAL certification similar to that of the software and/or software container that is to be modified. In one or more embodiments, a software container may contain software associated with aviation and/or military technology, wherein each software container may contain DAL classification 124. For example, and without limitation, a software container may include software such as engine control systems, inflight entertainment, missile guidance systems, fuel monitoring systems and the like.

With continued reference to FIG. 1, update data 118 may be configured for one or more operating environments 128. An "operating environment" for the purposes of this disclosure refers to the combination of hardware and software that allows a computer software to function or execute. For example, and without limitation, operating environment 128 may include an operating system, device drivers 132, virtual machines, software containers 136, software modules, executable programs and the like. In one or more embodiments, operating environment 128 may allow for the execution of computer software. In one or more embodiments, operating environments 128 may allow for the execution of software modules and/or software containers 136. software container 136 may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment 128 with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics software, electronic flight bag (EFB) software, ground support equipment software, weather forecasting and reporting software, cockpit display rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container 136. In one or more embodiments, any data and/or information within software container 136 may be used to ensure proper execution of software module. In one or more embodiments, software container 136 may contain libraries, dependencies, and the like to ensure proper execution of software module. In one or more embodiments, software module may include an executable file. In one or more embodiments, software module may include third party application wherein 3rd party applications may include software and/or application created and/or managed by a differing entity. In one or more embodiments, software module may include previously developed applications wherein the previously developed application are modified to interact with a particular environment. In one or more embodiments, software container 136 may allow for a third-party application and/or previously developed application to be deployed within multiple virtual environments and/or operating system. In one or more embodiments, software module may include a previously developed application and/or 3rd party application wherein software module may be placed within software container 136 to allow for software module to operate within multiple environments. A "software container" for the purposes of this disclosure is an executable package that is capable of running software within an isolated space. For example, and without limitation, software container 136 may include a document drafting software wherein the software container 136 may contain any information, runtime environment and the like necessary to execute the document drafting software on more than one operating systems. In one or more embodiments, software containers 136 may create a virtualized environment wherein a software may run within the virtualized environment. In one or more embodiments, operating environment 128 may include a virtualized environment. A "virtualized environment," for the purposes of this disclosure is a system in which software may be isolated while still operating on a host operating system. For example, and without limitation, software container 136 may operate in a virtualized environment wherein a software within software container 136 may not communicate with the host operating system. In one or more embodiments, software container 136 may allow for OS virtualization wherein a software may be isolated from a host operating system while still sharing the host operating system kernel. An "Operating system (OS) level virtualization," for the purposes of this discourse is a system in which an operating system kernel allows the existence of multiple isolated environment. In OS virtualization, a software within software container 136 may not have access to resources of the host operating system. Instead, the software may only have access to the contents within software container 136. In one or more embodiments, operating environment 128 may include a host operating system. A "host operating system" for the purposes of this disclosure is a primary operating system running on processor 108. In one or more embodiments, software container 136 may be executed atop host operating system. In one or more embodiments, virtual operating systems may exist atop host operating system. In one or more embodiments, host operating system may include an operating system configured to allow instantiation of one or more software containers 136, one or more virtual machines and the like. In one or more embodiments, software container 136 may communicate with host operating system to receive resources from processor 108 and/or memory. In one or more embodiments, an ordinary software operating outside of a software container 136 may have access to various operating system resources such as but not limited to, processing capabilities, file systems, networks and the like. In contrast, a software operating within a software container 136 may only have access to the contents within the software container 136. This may include various files, network capabilities and the like. In one or more embodiments, a software within software container 136 may communicate with software container 136 wherein software container 136 may transmit the commands to the processor 108. In one or more embodiments, software container 136 may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container 136 may contain OS level virtualization wherein a software within software container 136 may be executed in a virtualized environment. In one or more embodiments, software container 136 may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container 136 may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 116, and the like. In one or more embodiments, a software within software container 136 may operate in a runtime environment wherein the software may be isolated from the host operating system. In one or more embodiments, software container 136 may allow for an application to be executed and/or deployed on multiple operating systems. In one or more embodiments, software container 136 may contain libraries, configuration files, binary code and/or any other information that is necessary to execute the application and/or software. In one or more embodiments, a software container 136 may contain some degree of independence from the operating system and/or host system wherein the software container 136 does not rely on the operating system for any information needed to properly deploy an application within software container 136. In one or more embodiments, operating systems may lack the proper functionalities to execute an application, wherein software container 136 may be used to ensure that any necessary functionalities, information, and the like are self-contained. In one or more embodiments, software container 136 may contain a container image, wherein the container image is a portable executable image combined with a manifest that is used by a container manager to deploy the container image on an operating environment 128 with appropriate data services and restrictions. In one or more embodiments, software container 136 may contain restrictions and/or instructions on how a software may communicate with the operating system in which it is deployed on. In one or more embodiments, software container 136 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools. In one or more embodiments, software container 136 may include any software container 136 as described in U.S. Nonprovisional application Ser. No. 18/395,210 filed on Dec. 12, 2023 and entitled "SYSTEM AND METHOD FOR A SAFETY CRITICAL OPERATING ENVIRONMENT 128 CONTAINER ARCHITECTURE, and U.S. Nonprovisional application Ser. No. 18/443,570 filed on Feb. 16, 2024 and entitled "SYSTEM AND METHODS FOR PROVIDING INTEROPERABLE NETWORKS AND COMMUNICATIONS" the entirety of which are incorporated herein by reference.

With continued reference to FIG. 1, update data 118 may be configured for one or more operating environments 128. In one or more embodiments, update data 118 may be configured for one or more operating environments 128 wherein update data 118 may be used to modify an existing operating system, modify a software module, modify a software, modify a software container 136, modify a device driver 132 and the like. In one or more embodiments, update data 118 may be configured for one or more operating environments 128 wherein information contained within update data 118 may be specific to the operating environment 128 in which modification is sought. In one or more embodiments, update data 118 may include information associated with the updating environment that is sought to be modified such as but not limited to, information associated with software, information associated with DAL classification 124 and the like. In one or more embodiments, each operating environment 128 may contain DAL classification 124 wherein update data 118 may contain the same DAL classification 124.

With continued reference to FIG. 1, update data 118 may include an update or modification for a device driver 132. A "device driver" also known as a "software driver" for the purposes of this disclosure is a software component configured to control a specific hardware device attached to a computing system. For example, and without limitation, device driver 132 may include a software configured to allow for communication between a storage device and a computing system. In one or more embodiments, device driver 132 may control how a particular hardware device communicates with the computer's operating system. In one or more embodiments, each hardware device on a computing system may contain a unique device driver 132 that controls how the hardware device communicates with the operating system and/or operating environment 128. In one or more embodiments, differing operating systems may communicate with hardware devices differently. Device drivers 132 may allow for hardware devices to communicate with differing operating systems. In one or more embodiments, device drivers 132 may control the communication between an operating system and a hardware device to ensure proper communication. In one or more embodiments, a device driver 132 may provide a software interface between a virtual environment and a hardware device. In one or more embodiments, update data 118 may include an update or modification for a device driver 132 wherein update may alter and/or update how communications are made between the virtual environment and the hardware device. In one or more embodiments, updates and/or modifications may allow for increased computing efficiency, decreased software related issues, increased communication reliability, and the like.

With continued reference to FIG. 1, update data 118 may be generated by a user, "User" for the purposes of this disclosure is an individual associated with operating environment 128 and/or a software within operating environment 128. For example, and without limitation user may include a computer technician, a software engineer, an agent of an entity associated with the creation and/or management of a software that is sought to be updated and the like. In one or more embodiments, a user may be tasked with creating update data 118 in order to update or modify an existing software. In one or more embodiments, a user may input instructions and/or code in order to modify one or more aspects of a software. In one or more embodiments, a software may contain various software related issues wherein update data 118 may include instructions to resolve the software related issues. In one or more embodiments, update data 118 may be generated by a user on computing device 104 and/or a remote device. In one or more embodiments, a remote device may include a device separate from computing device 104, such as but not limited to, a smart phone, a separate desktop computer, a computing device 104 in a differing location and the like. In one or more embodiments, update data 118 may be received from a distribution repository. A "distribution repository" for the purposes of this disclosure is a centralized location in which software is stored and made available for installation. In one or more embodiments, distribution repositories may serve as a central network or database in which users may be able to retrieve an install software and/or retrieve update data 118. In one or more embodiments, user may include a distribution management entity wherein the distribution management entity is responsible for deploying updates on systems and software. IN one or more embodiments, distribution management entity may be responsible for ensuring that software is properly installed and/or modified on a system. In one or more embodiments, distribution management entities may be tasked with retrieving software such as update data and installing the software on an individual's system.

With continued reference to FIG. 1, processor 108 is configured to append a digital signature 140 to update data 118. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described in this disclosure. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature 140 is equivalent to possession of the private decryption key and/or device-specific secret. Likewise, if a message making up a mathematical representation of file is well-designed and implemented correctly, any alteration of the file may result in a mismatch with the digital signature 140; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature 140.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature 140 confirms the identity of the entity and links the file to the entity in a verifiable way. Digital signature 140 may be incorporated in a digital certificate, which is a document authenticating the entity possessing the private key by authority of the issuing certificate authority and signed with a digital signature 140 created with that private key and a mathematical representation of the remainder of the certificate. In other embodiments, digital signature 140 is verified by comparing the digital signature 140 to one known to have been created by the entity that purportedly signed the digital signature 140; for instance, if the public key that decrypts the known signature also decrypts the digital signature 140, the digital signature 140 may be considered verified. Digital signature 140 may also be used to verify that the file has not been altered since the formation of the digital signature 140.

With continued reference to FIG. 1, processor 108 may be configured to append digital signature 140 to update data 118 wherein data signature may be attached or added to the end of a data file, such as to the end of update data 118. In one or more embodiments, processor may be configured to transmit digital signature 140 along with update data 118. In one or more embodiments, update 118 and digital signature may be transmitted as separate files and/or within separate transmission. In one or more embodiments, processor 108 may take a hash (wherein a hash may include a string generated by characters within update data 118) of update data 118 and encrypt the hash with the sender/user's private key. In one or more embodiments, digital signature 140 may be appended to update data 118 wherein a recipient may confirm the authenticity of update data 118 using the sender's public key. In one or more embodiments, a hash function may be applied to upload data, wherein the hash function may be configured to create a string of fixed size using information from within update data 118. In one or more embodiments, the hash may be encrypted using a private key belonging to the sender, such as the user. In one or more embodiments, the hash may be appended to upload data. In one or more embodiments, the recipient of upload data, such as an individual and/or computing device 104, may decrypt the hash using a public key and compare the decrypted hash to an independently generated hash. In one or more embodiments, comparison of two hashes may authenticate the origin of update data 118.

With continued reference to FIG. 1, in one or more embodiments, appending digital signature 140 to update data 118 may include encrypting update data 118. In one or more embodiments, processor 108 may be configured to encrypt update data 118 using one or more cryptographic processes as described above. In one or more embodiments, processor 108 may utilize a cryptographic system as described above to convert plaintext within upload data to ciphertext. In one or more embodiments, a user may encrypt upload data wherein a software and/or operating environment 128 configured to receive upload data may contain the decryption key. In an embodiments, encryption may ensure that data is not tampered and/or viewed during transmission and that the proper operating environment 128 receives the proper upload data. In one or more embodiments, encrypting upload data may include the production of cryptographic hashes. In one or more embodiments, processor 108 may generate one or more cryptographic keys using one or more key generation processes as described in this disclosure. In one or more embodiments, digital signature 140 and/or upload data may be encrypted using an encryption key.

With continued reference to FIG. 1, in one or more embodiments, processor 108 may be configured to append digital signature 140, associated with an update data source, to update data 118. In one or more embodiments, digital signature 140 may be associated with a source of update data 118, wherein a source of update data 118 may include the sender of update data 118, the creator and/or modified of update data 118 and the like. In one or more embodiments, digital signature may include information associated with the source of update data 118 in order to put a recipient on notice as to the source of the transmission. In one or more embodiments, digital signature 140 may be unique to each source of a data transmission wherein digital associated with update data 140 may include identifying information that may be used to identify the source of update data 118. In one or more embodiments, digital signature may be associated with update data source wherein digital signature may include identifiers indicating the source of the transmission and the authenticity of the source.

With continued reference to FIG. 1, processor 108 is configured to identify at least one operating environment 128 for receipt of update data 118. In one or more embodiments, processor 108 may be configured to determine operating environments 128 for receipt of update data 118 and subsequent modification. In one or more embodiments, operating environments 128 may be communicatively connected to a central server, database 116 and the like wherein processor 108 may be configured to identify and/or select operating environments 128 connected to the central server and/or database 116. In one or more embodiments, operating environments 128 may systemically and/or continuously communicate with a central server, database 116 and the like wherein processor 108 may be configured to identify operating environments 128 as a result. In one or more embodiments, operating environments 128 may continuously communicate with a central server, database 116, cloud and the like for updates and/or modifications. In one or more embodiments, a central server and/or database 116 may contain a list of operating environments 128 with a particular software, software module and the like wherein processor 108 may be configured to identify operating environments 128 as indicated within the list. In one or more embodiments, upon installation of a software within an operating environment 128, a computing system may communicate to computing device 104 and/or database 116 that the software has been installed. In one or more embodiments, operating environments 128 that have installed one or more software may be placed on a list indicating so. In one or more embodiments, database 116 may contain centralized logs that indicate which operating environments 128 currently have a particular software installed. In one or more embodiments, deployment tools such as Microsoft SCCM may be used to manage the installation of software across multiple devices wherein processor 108 may utilize the deployment tools to identify operating environments 128. In one or more embodiments, operating environments 128 may communicate with a central network wherein communication may include communication to receive update data 118. In one or more embodiments, upon installation of a software within operating environment 128, a computing system may communicate with a central network that the software has been installed. In one or more embodiments, processor 108 may contain a central network and/or database 116 with a plurality of operating environments 128 wherein each operating environment 128 may be associated with an installed software.

With continued reference to FIG. 1, in one or more embodiments, processor 108 may be configured to identify one or more operating environments 128 for receipt of update data 118 by determining a compliance of one or more operating environments 128 and identifying at least one operating environment 128 as a function of the compliance. In one or more embodiments, processor 108 is configured to verify a compliance of operating environment 128 with a plurality of predetermined safety standards sourced from a trusted repository by monitoring an adherence of the operating environment 128 to a pre-defined operational rule. As used in this disclosure, a "compliance" is a data element measuring a conformance of operating environment 128 to established guidelines or specifications designed to ensure the safety and reliability of operating environment 128 (especially within operating environments where failure may lead to significant harm or loss) known as "safety standards." In some cases, compliance may include a quantitative value such as a score or a range of scores. In other cases, compliance may include one or more binary representations, for example, "1" and "0" or "TRUE" and "FALSE," wherein "1/TRUE" may indicate operating environment 128 is compliant with at least one corresponding safety standard and "0/FALSE" may indicate operating environment 128 is non-compliant with the at least one corresponding safety standard. A "trusted repository," for the purpose of this disclosure, is a trust entity e.g., a secure storage or even a trusted partition, wherein a plurality of safety standards are kept. In a non-limiting example, trusted repository may be considered authoritative and tamper-proof e.g., one or more secure databases, version control systems, and/or certified data centers. In an embodiment, processor 108 may be configured to evaluate compliance to ensure that operating environment 128 may perform all functions specified to at least one operational rule. In a non-limiting example, processor 108 may be configured to determine design assurance level classification (DAL) associated with operating environment to determine compliance.

With continued reference to FIG. 1, in some cases, compliance may include an assessment of operating environment's 128 conformance to at least one operational rule that dictate operating environments 128 behavior, known as the "adherence." In a non-limiting example, at least one operational rule may dictate how it must perform under various conditions to be considered compliant. In a non-limiting example, at least a processor 108 may be configured to verify the execution or safety of operating environment. In some cases, at least a processor 108 may assign a high score to operating environment 128 which executed without interference e.g., functions within its runtime without being interrupted or influenced by other processes or partitions, maintaining strict timing and performance as per its safety standards. In another non-limiting example, at least a processor 108 may be configured to check the integrity of data processed and/or data transmitted by operating environment 128 using one or more error-checking algorithm or secure data transmission protocols. In some cases, compliance may include DO-178C for avionics, ISO 26262 for automotive safety, IEC 61508 for industrial system safety, and/or the like. In some cases, a high compliance may indicate operating environment 128 adheres to standards e.g., RTCA/DO-178C for software in airborne systems. In some cases, high compliance may include a certification of ISO 27001. In a non-limiting example, operating environment such as a flight control system software may be rigorously tested and verified against DO-178C standard based on observed runtime behaviors through simulation and/or in-flight testing.

With continued reference to FIG. 1, processor 108 may be configured to identify one or more operating environments 128 as a function of DAL classification 124. In one or more embodiments, processor 108 may be configured to determine compliance as a function of DAL classification 124. In one or more embodiments, determining a compliance may include determining a DAL Classification 124 wherein operating environment 128 containing a similar DAL classification 124 to that of update data may be referred to as 'compliant'. In one or more embodiment, operating environments 128 that have been deemed to be compliant may be identified and/or selected for fourth authentication as described below. In one or more embodiments, a plurality of operating environments 128 may exist wherein each operating environment 128 may be associated with a particular DAL classification 124. For example, and without limitation, it may be the case that a central network and/or database 116 may be used for multiple differing software and/or operating environments 128 wherein each software and/or operating environment 128 may contain a particular DAL classification 124. In one or more embodiments, processor 108 may be configured to identify, and/or ensure compliance of, operating environments 128 based on DAL classification 124. In one or more embodiments, each operating environment 128 may contain a DAL classification 124 wherein processor 108 may be configured to identify operating environments 128 with similar DAL classifications 124 to that listed within update data 118. In one or more embodiments, processor 108 may be configured to determine a DAL classification 124 of operating environments 128 and identify at least one operating environment 128 as a function of the DAL classification 124. In one or more embodiments, identification may further include a selection of operating environments 128 suitable to receive updated data. In one or more embodiments, update data 118 may include information associated with the software and/or type of operating environment 128 sough to be modified wherein processor 108 may be configured to select operating environments 128 based on the information provided. In one or more embodiments, update data 118 may include the name of the operating environments 128 to be updated, the category, the DAL classification 124 and the like. In one or more embodiments, operating environment 128 and/or software may contain unique identifiers to identify operating environments 128 and/or categories of operating environments 128. In one or more embodiments, update data 118 may contain the unique identifier as well wherein operating environments 128 may be identified and/or selected as a result. In one or more embodiments, identification of operating environments 128 may ensure that update data 118 is being transmitted to the correct operating environments 128. In one or more embodiments, identifying one or more operating environments 128 may include comparing DAL classification 124 of update date to DAL classification 124 of one or more operating environments 128. In an embodiments, update data 118 and operating environments 128 containing differing DAL classifications 124 may indicate that the update data 118 the operating environment 128 is not suitable for update data 118. In one or more embodiments, a database 116 may include a list of systems and/or operating environments 128 wherein processor 108 may be configured to identify operating environments 128 based on DAL classification 124, based on unique identifiers within update data 118, based on the class of operating environments 128 as indicated within update data 118 and the like. In one or more embodiments, operating environments 128 may be identified and differed from one another through the use of unique identifiers, IP addresses and the like.

With continued reference to FIG. 1, processor 108 may be configured to identify operating environments 128 as a function of an update request. An "update request" for the purposes of this disclosure is a communication made by one or more operating environments 128 seeking receipt of update data 118. For example, and without limitation, operating environments 128 may transmit an update request to determine if new update data has been created. In one or more embodiments, operating environments may communicate with a cloud network to continuously, periodically and/or systematically request update data 118. In one or more embodiments, operating environments 128 may transmit update requests to a cloud network and/or to computing device 104 wherein processor 108 may be configured to identify operating environment 128 and transmit update data 118 if conditions allow. In one or more embodiments, update data 118 may be stored on a central network and/or database 116 until update request is received. In one or more embodiments, following receipt of update request, processor 108 may identify the operating environment seeking update data 119 and authenticate operating environment 128 as described in further detail below.

With continued reference to FIG. 1, processor 108 is configured to authenticate operating environments 128 that have been identified. In one or more embodiments, processor 108 may identify at least one operating environment 128 that requires receipt of update data 118 and authenticate the at least one operating environment 128. In an embodiment, operating environments 128 may be identified yet may not be authenticated such that they are not suitable for receipt of update data 118. In one or more embodiments, an authentication process may include a determination of whether one or more data sets (e.g. operating environments 128 and/or information associated with operating environments 128) are suitable for processing. In one or more embodiments, authentication of operating environments 128 may include a process in which computing device 104 may determine if the identified operating environments 128 are suitable for receipt of update data 118. In one or more embodiments, an authentication of one or more operating environments 128 may include a process in order to ensure that operating environments 128 have not been tampered with and/or operating environments 128 with invalid credentials do not receive update data 118. In an embodiments, update data 118 may contain sensitive information wherein authentication of operating environments 128 may ensure the trustworthiness of the recipient in possession and/or in control of operating environment 128.

With continued reference to FIG. 1, authentication of operating environment 128 may include identification of unique identifiers and a comparison of the unique identifier associated with the operating environment 128 with a list contained within database 116. In one or more embodiments, database 116 may contain a list of unique identifiers (and/or allowable IP addresses) associated with operating environments 128 wherein the lack of a particular unique identifier may indicate that the operating environment 128 lacks proper authentication to receive update data 118. In one or more embodiments, authentication of operating environments 128 may include the transmission of an encrypted data file to the operating environment 128 and receipt of the unencrypted data file. In an embodiments, receipt of the unencrypted data file may indicate that the operating environment 128 contains the requisite decryption key to decrypt the data file. In one or more embodiments, authentication may include identification of digital signatures, checksums, and the like. In one or more embodiments, processor 108 may be configured to determine if an operating environment 128 has been tampered with through identification and validation of digital signature 140. In one or more embodiments, processor 108 may be configured to receive a digital signature 140 from operating environment 128 and authenticate digital signature 140. In one or more embodiments, each operating environment 128 may contain their own session identification wherein lack a session identification and/or lack of a proper session identification may indicate that the operating environment 128 has not been authenticated.

With continued reference to FIG. 1, each operating environment 128 may contain an update log 144. "Update log" for the purposes of this disclosure is information associated with the operating environment 128 that can be used to ensure authentication of an operating environment 128 for receipt of update data 118. For example, and without limitation, update log 144 may include the name or unique identifier of the operating environment 128. In one or more embodiments, update log 144 may include changes made to the operating environment 128 such as updates, modifications, the addition of instructions and/or code and the like. In one or more embodiments, update log 144 may include changes made to operating environment 128. In one or more embodiments update log 144 may include a date and time stamp for each change made to operating environment 128. In one or more embodiments, update log 144 may include previously generated update data 118 and a correlated time stamp as to when the previously generated update data 118 was received. In one or more embodiments, in each iteration a differing update data 118 may be generated for transmission wherein operating environments 128 may append update log 144 to include the recently received update data 118. In one or more embodiments, update log 144 may further include unique identifier associated with update data 118, digital signatures, and the like. In one or more embodiments, update log 144 may include modifications made to operating environment 128 and correlated time stamps. In one or more embodiments, update log 144 may be write only and/or read only wherein data may not be modified and/or removed to ensure the update log 144 is not tampered. In one or more embodiments, update log 144 may include the source of the modifications such as the source of transmission of the previously received update data 118. This may include IP addresses, digital signatures that can be used to authenticate a source and the like. In one or more embodiments, update log 144 may include a hash of the executable of operating environment 128 and/or a software within operating environment 128. In one or more embodiments, update log 144 may include a hash of the code using for execution of operating environment 128. In one or more embodiments, update log 144 may include a hash of the data within update log 144. In one or more embodiments, update log 144 may include access history wherein the access history indicates the previous accessing of update log 144 and associated timestamps. In an embodiment, an unrecognized access of update log 144 may indicate potential tampering of update log 144. In one or more embodiments, elements within update log 144 may include time stamps, such as timestamps indicating a date of receipt, a date of modification and the like. In one or more embodiments, prior to transmission of update data 118, processor 108 may request update log 144 from one or more operating environment 128 for review. In one or more embodiments, prior to transmission of update data 118, processor 108 may be configured to determine the authenticity of operating environment 128 through update log 144.

With continued reference to FIG. 1, processor 108 may be configured to compare update log 144 to a central log 148. "Central log" for the purposes of this disclosure is information associated within update log 144 that has been received or generated on a previous instance and secured on database 116. For example, and without limitation, processor 108 may receive update log 144 and store it on a server and/or database 116 and use the update log 144 as a central log 148.

In another non limiting example, processor 108 may receive update log 144 on a previous iteration and store update log 144 on database 116 as central log 148. In one or more embodiments, processor 108 may be configured to generate central log 148 similar to that of update log 144 where a second set of information may be stored on a remote database 116 away from operating environment 128. In one or more embodiments, central log 148 may be used to ensure that update log 144 has not been tampered with since a previous iteration of the processing. In one or embodiments, following modification and/or changes to operating environment 128, both central log 148 and update log 144 may be simultaneously updated. In one or more embodiments, each authorized addition to update log 144 may be added to central log 148 as well. In one or more embodiments, following authorized changes (e.g., through the receipt of update data 118) made to operating environment 128, both update log 144 and central log 148 may be updated and/or appended to. In one or more embodiments, central log 148 may be used to ensure that unauthorized changes have not been made to update log 144. In one or more embodiments, changes to operating environment 128 may be documented within update log 144 and central log 148 with a corresponding time stamp wherein differing data between central log 148 and update log 144 may indicate that an operating environment 128 has been modified without permission. In one or more embodiments, following transmission of update data 118 in each iteration, processor 108 may be configured to append to central log 148 and update log 144 in order to document that changes have been made. In one or more embodiments, authentication of operating environment 128 includes a comparison between central log 148 and update log 144. In one or more embodiments, inconsistencies between update log 144 and central log 148 may indicate that an operating environment 128 has been tampered with and/or has not been properly validated. In one or more embodiments, processor 108 may be configured to compare update log 144 and central log 148 to determine a degree of match wherein the degree of match may indicate authentication of operating environment 128. In one or more embodiments, central log 148 may be located on a secure database 116, network server and the like. In one or more embodiments, central log 148 may be encrypted to prevent viewing of central log 148 by unauthorized users. In one or more embodiments, central log 148 may be read only and/or write only wherein data may not modified and/or deleted, only added. In one or more embodiments, central log 148 may have 'append-only access' wherein only data may be added and not removed. In one or more embodiments, file restrictions on central log 148 may ensure that data may only be added to the end of central log 148 wherein a user may not insert information within central log 148. In one or more embodiments, central log 148 may be stored on an immutable sequential listing as described in further detail below to ensure that data is not removed and/or modified. In one or more embodiments, central log 148 may include an immutable data structure wherein the immutable data structure includes a data structure in which data cannot be modified or deleted. In one or more embodiments, in an immutable data structure, data may only be added to the end of the immutable data structure and therefore data cannot be altered or changed. In one or more embodiments, processing may implement checksum and/or hashing mechanisms within update log 144 and/or central log 148 wherein modification to update log 144 and/or central log 148 may cause the checksum and/or hashing mechanism to contain differing information. In one or more embodiments, central log 148 may include a checksum and/or hash wherein update log 144 may be compared to the checksum and/or hash. IN one or more embodiments, processor 108 may be configured to implement versioning of update log 144 and/or central log 148 wherein modification of update log 144 and/or central log 148 may cause a new version to be created. In one or more embodiments, processor 108 may be configured to compare versions of update log 144 and central log 148 wherein differing versions may indicate tampering. In one or more embodiments, both central log 148 and update log 144 may contain access history indicating previous dates in which the data has been accessed. In one or more embodiments, differing access history may indicate that update log 144 may have been tampered.

With continued reference to FIG. 1, central log 148 may contain one or more timestamps that have been generated by a trusted time stamp authority and cryptographically signed to ensure its authenticity. In one or more embodiments, a time stamp that has been generated by a trust time stamp authority and cryptographically signed by referred to as an 'attested timestamp 152.' In one or more embodiments, central log 148 may contain one or more attested time stamps indicating modifications and/or updates made to operating environment 128. In an embodiments, following receipt of update data 118, an attested time stamp may be created wherein central log 148 may contain a plurality of attested timestamps 152 from previous iterations. In one or more embodiments, attested time stamps may include timestamps associated with a files creation, a files most recent modification and the like. In one or more embodiment, comparing update log 144 to central log 148 may include comparing time stamps within update log 144 to attested time stamps within central log 148. In one or more embodiments, an attested time stamp within central log 148 may be associated with the file creation and/or last modification of update log 144 wherein processor 108 may be configured to compare attested time stamp to update log 144. In one or more embodiments, comparison of central log 148 and update log 144 may include the process of trusted time stamping. In one or more embodiments, trusted timestamping may include the process of securely keeping track of various times associated with a data file. In one or more embodiments, trusted timestamping may include the process of ensuring that timestamps are immutable such that they cannot be tampered with. In one or more embodiments, trusted timestamping may include submission of a request to a trusted time stamp authority. The time stamp authority may then generate a timestamp for the given data, such as update log 144, in the form of a digital signature 140. The timestamp may be cryptographically linked to the data to ensure security. In one or more embodiments, ensuring the authenticity of update log 144 may include comparing a timestamp within update log 144 to the timestamp given by the timestamp authority.

As used in this disclosure, "verification" is a process of ensuring that which is being "verified" complies with certain constraints, for example without limitation system requirements, regulations, and the like. In some cases, verification may include comparing a product, such as without limitation update log 144 against one or more acceptance criteria. For example, in some cases, update log 144 may be required to contain similar information to that of central log 148. Ensuring that update log 144 is in compliance with acceptance criteria may, in some cases, constitute verification. In some cases, verification may include ensuring that data is complete, for example that all required data types are present, readable, uncorrupted, and/or otherwise useful for computing device 104. In some cases, some or all verification processes may be performed by computing device 104. In some cases, at least a machine-learning process, for example a machine-learning model, may be used to verify. Computing device 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation update log 144 against a specification. In some cases, computing device 104 may be additionally configured to validate a product by validating constituent sub-products. In some embodiments, computing device 104 may be configured to validate any product or data, for example without limitation update log 144. In some cases, at least a machine-learning process, for example a machine-learning model, may be used to validate by computing device 104. Computing device 104 may use any machine-learning process described in this disclosure for this or any other function.

With continued reference to FIG. 1, following authentication of one or more operating environments 128, processor 108 may is configured to transmit update data 118 to one or more operating environments 128. In an embodiments, only operating environments 128 that have been determined to be authenticated may be eligible for receipt of update data 118. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. In one or more embodiments, processor 108 may be configured to transmit update data 118 to database 116 and/or a network server and transmit update data 118 from the database 116 to one or more operating environments 128. In one or more embodiments, update data 118 may be stored on database 116, wherein processor 108 may be configured to notify authenticated operating environments 128 that an update data 118 is ready to be received. In one or more embodiment, update data 118 may first be transmitted to a database 116 to ensure proper transmission to one or more operating environments 128.

With continued reference to FIG. 1, in one or more embodiments it may be the case that update data 118 may be large in size and/or the location of one or more operating environments 128 may cause network transmission delays. In one or more embodiments, processor 108 may be configured to transmit update data 118 using delay tolerant network 156. Delay tolerant network 156 (DTN) is a network communication system in which data is transmitted into smaller units in order to facilitate transmission of data in unreliable or intermittent networks. For example, and without limitation, operating environment 128 may be executed on a remote device located within the ocean or on an aircraft wherein network connectivity may be intermittent and/or slow. In another non limiting example, operating environments 128 may exist on remote devices that may be located beneath the surface of the earth wherein network connections may be sporadic and/or intermittent. In one or more embodiments, update data 118 may be divided into a plurality of data bundles 160 wherein each data bundles 160 included a portion of update data 118. In one or more embodiments, data bundles 160 may be transmitted independently, such that update data 118 may be transmitted in portions. In one or more embodiments, data bundles 160 may be independently encrypted to ensure further security. In one or more embodiments, processor 108 may be configured to create a plurality of data bundles 160 and encrypt each data bundle 160. In one or more embodiments, processor 108 may be configured to assign a unique identifier to each data bundle 160, wherein the unique identifier may be used to determine the placement of each data bundle 160 when they are all ultimately received and combined to create update data 118. In one or more embodiments, unique identifiers associated with data bundles 160 may be encrypted to ensure that an unwanted recipient may not intercept data bundles 160 and combine them to create update data 118. In one or more embodiments, both the data bundles 160 and the unique identifiers may be encrypted with similar or differing encryption processes to ensure a two level system of protection. In one or more embodiments, data bundles 160 may be transmitted across participating nodes 164. A "participating node" for the purposes of this disclosure refers to a device or a network that participates in the communication process between computing device 104 and operating environment 128. In one or more embodiments, participating nodes 164 may be responsible for the transmission of data bundles 160. In one or more embodiments, participating nodes 164 may include networks, devices and/or remote devices that can receive, store and transmit data bundles 160. In one or more embodiments, operating environments 128 may be located on device with sporadic and/or intermittent network connections wherein data bundles 160 may be transmitted across participating nodes 164 until they arrive at their final destination. In one or more embodiments, processor 108 may be configured to determine a route along one or more participating nodes 164 between a source node and a destination node. In one or more embodiments, the source node may include the source of the transmission of update data 118 and/or data bundles 160 such as computing device 104 and/or database 116. In one or more embodiments, the destination node includes the final destination of update data 118 and/or data bundles 160 such as a device in which operating environment 128 may be running on. In one or more embodiments, processor 108 may be configured to determine a path among participating nodes 164, wherein data bundles 160 may be transmitted to a corresponding node until they reach their final destination. In one or more embodiments, routing algorithms may be used to determine the most optical path from a source node to a destination node. In one or more embodiments, routing algorithms may depend on the connection between participating nodes 164, the storage capacity of participating nodes 164, the historical success for a participating node 164 and the like. In one or more embodiments, processor 108 may be configured to determine one or more paths in which data bundles 160 may be transmitted wherein the paths include one or more nodes connected to one another. In one or more embodiments, during instances in which a connection is made, data may be transferred one or more participating node 164 to another until the data bundles 160 arrive at their final destination.

With continued reference to FIG. 1, processor 108 may use predictive modeling to determine which participating nodes 164 should be selected for transmission of data bundles 160. In one or more embodiments, predictive modeling may allow for predictions of future and/or anticipated network connections based on historical data, wherein participating nodes 164 may be selected as a result. In one or more embodiments, processor 108 may use adaptive modeling to reroute data bundles 160 in order to increase the transmission rate of data bundles 160. In one or more embodiments, processor 108 may be configured to select nodes based on their ability to transmit data. In one or more embodiments, processor 108 may assign data bundles 160 to selected participating nodes 164 based on the size of data bundles 160 and the capacity of participating nodes 164. In one or more embodiments, processor 108 may utilize predictive modeling, adaptive modeling, selection of nodes and the like as a function of a machine learning model. The machine learning model may include any machine learning model as described in this disclosure. Processor 108 may use a machine learning module, such as a node machine learning module for the purposes of this disclosure, to implement one or more algorithms or generate one or more machine-learning models, such as a node machine learning model to determine one or more paths for data bundles 160 to be transmitted along. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or provided by a user. In other embodiments, a machine-learning module may obtain a training set by querying a communicatively connected database 116 that includes past inputs and outputs. Training data may include inputs from various types of database 116s, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as node machine learning module, may be used to create node machine learning model and/or any other machine learning model using training data. Node machine learning model may be trained by correlated inputs and outputs of training data. Training data may be data sets that have already been converted from raw data whether manually, by machine, or any other method. Node training data may be stored in database 116. Node training data may also be retrieved from database 116. In some cases node machine learning model may be trained iteratively using previous inputs correlated to previous outputs. For example, processor 108 may be configured to store participating node 164 paths and their corresponding transmission from current iterations to train the machine learning model. In some cases, the machine learning model may be trained based on user input. For example, a user may indicate that determined paths or routes were unreliable and/or slow wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, node training data may include a plurality of source nodes and destination nodes correlated to a plurality of node paths. In an embodiment, a node path may include a route from a source node to a destination node. In one or more embodiments, node machine learning model may be configured to output node paths based on source nodes and destination nodes. In one or more embodiments, node machine learning model may be trained using historical data such as transmissions made on previous iterations. In an embodiment, historical data may indicate the most optical node paths between source node and destination node. In one or more embodiments, following each iteration node paths and their corresponding transmission time may be used to iteratively train machine learning model in order to create more efficient node paths. In one or more embodiments, training of node machine learning model may allow for selection of more efficient node paths and may increase the reliability of a transmission. In one or more embodiments, each participating node 164 may include a correlated storage capacity, wherein the correlated storage capacity may indicate the maximum storage size of a data bundles 160. In one or more embodiments, processor 108 may be configured to assign data bundles 160 to node paths based on storage size using node machine learning model. In one or more embodiments, processor 108 may be configured to identify a plurality of participating nodes 164 on a network, wherein processes may be configured to determine node path as a function of the plurality of participating nodes 164. In one or more embodiments, node machine learning model may be configured to receive plurality of participating nodes 164, including source node and destination node wherein node machine learning model may be configured to generate node path from source node to destination node.

With continued reference to FIG. 1, processor 108 may be configured to receive an update response 168 following transmission of update data 118. In one or more embodiments, following transmission of update data 118, operating environment 128 and/or a software within operating environment 128 may be configured to transmit an update response 168. An "update response" as described in this disclosure is information indicating receipt of update data 118. In one or more embodiments, operating environment 128 may be configured to transmit update response 168 to notify computing system that update data 118 has been properly received. In one or more embodiments, update response 168 may be used to indicate that operating environment 128 has independently authenticated update data 118 and/or the source of update data 118. In one or more embodiments, update response 168 may be used to ensure independent authentication of update data 118. in one or more embodiments, computing device 104 and/or operating environment 128 may utilize one or more trusted computing processes to prevent unwanted tampering of data. In one or more embodiments, operating environment 128 may employ a similar authentication process to that of computing device 104 prior to receipt of update data 118. In one or more embodiments, following receipt of update data 118, update log 144 and central log 148 may be independently updated and/or appended to indicate receipt of update data 118. In one or more embodiments, appending or modification of update log 144 and central log 148 may be used to document any changes made to operating environment 128. In one or more embodiments, update response 168 may include a hash of update data 118 to ensure proper receipt of update data 118.

Figure 2:
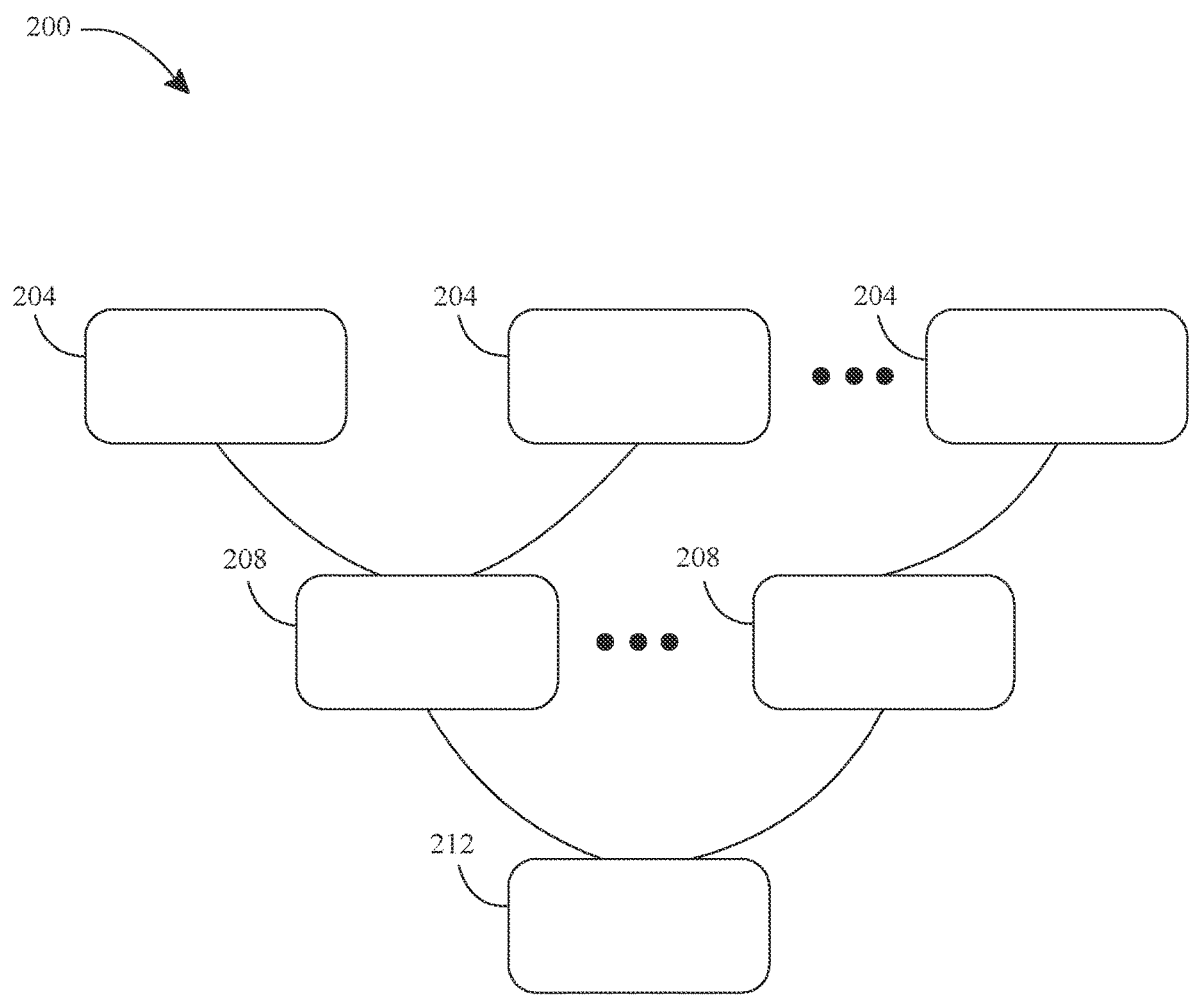
FIG. 2 illustrates an exemplary embodiment of a cryptographic accumulator.

Referring now to FIG. 2, an exemplary embodiment of a cryptographic accumulator 200 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 200 has a plurality of accumulated elements 204, each accumulated element 204 generated from a lot of the plurality of data lots. Accumulated elements 204 are create using an encryption process, defined for this purpose as a process that renders the lots of data unintelligible from the accumulated elements 204; this may be a one-way process such as a cryptographic hashing process and/or a reversible process such as encryption. Cryptographic accumulator 200 further includes structures and/or processes for conversion of accumulated elements 204 to root 212 element. For instance, and as illustrated for exemplary purposes in FIG. 2, cryptographic accumulator 200 may be implemented as a Merkle tree and/or hash tree, in which each accumulated element 204 created by cryptographically hashing a lot of data. Two or more accumulated elements 204 may be hashed together in a further cryptographic hashing process to produce a node 208 element; a plurality of node 208 elements may be hashed together to form parent nodes 208, and ultimately a set of nodes 208 may be combined and cryptographically hashed to form root 212. Contents of root 212 may thus be determined by contents of nodes 208 used to generate root 212, and consequently by contents of accumulated elements 204, which are determined by contents of lots used to generate accumulated elements 204. As a result of collision resistance and avalanche effects of hashing algorithms, any change in any lot, accumulated element 204, and/or node 208 is virtually certain to cause a change in root 212; thus, it may be computationally infeasible to modify any element of Merkle and/or hash tree without the modification being detectable as generating a different root 212. In an embodiment, any accumulated element 204 and/or all intervening nodes 208 between accumulated element 204 and root 212 may be made available without revealing anything about a lot of data used to generate accumulated element 204; lot of data may be kept secret and/or demonstrated with a secure proof as described below, preventing any unauthorized party from acquiring data in lot.

Alternatively or additionally, and still referring to FIG. 2, cryptographic accumulator 200 may include a "vector commitment" which may act as an accumulator in which an order of elements in set is preserved in its root 212 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 200 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the bash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 3:
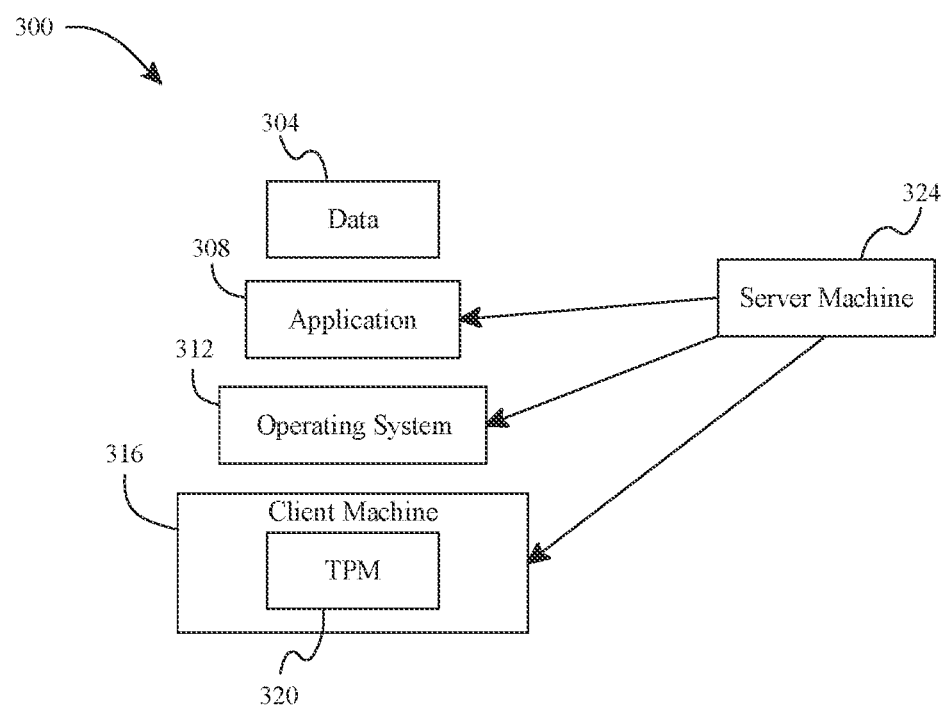
FIG. 3 is an exemplary embodiment of a system for a trusted computing architecture.

Referring now to FIG. 3, an exemplary embodiment of a system 300 for a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, trusted computing may which system 312 and application 308 perform one or more actions, determinations, calculations, or the like as described in this disclosure. Trusted computing may also enable integrated data privacy involving NFTs in the launching of the NFTs onto a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data 304, and other system state information, and remote attestation configured to allow a trusted device to present reliable evidence to remote parties about the software it is running.

In a non-limiting embodiment, and still referring to FIG. 3, trusted computing may include a secure coprocessor and/or cryptoprocessor such as without limitation a Trusted Platform Module (TPM) 320. A "Trusted Platform Module," as used in this disclosure, is a tamper resistant piece of cryptographic hardware built onto a system board or other hardware that implements primitive cryptographic functions on which more complex features can be built. A client machine 316 may be integrated with TPM 320 architecture which a server machine 324 may verify. In a non-limiting embodiment, client machine 316 may be consistent with a computing device as described in the entirety of this disclosure. In another non-limiting embodiment, client machine 316 may be consistent with apparatus 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data 304, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 324 such as a certification authority (CA). A "certificate authority," as used in this disclosure, is an entity that issues digital certificates.

In a non-limiting embodiment and still referring to FIG. 3, a TPM may perform an integrity measurement to enable a user and/or process access to private data 304. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example and without limitation, at load-time, TPM may use a hash function to fingerprint an executable, an executable plus its input data 304, or a sequence of such files. These hash values may be used in attestation to reliably establish code identity to remote or local verifiers such as server machine 324. Hash values can also be used in conjunction with a sealed storage feature. A secret may be scaled along with a list of hash values of programs that are allowed to unseal the secret. This may allow creation of data files that can only be opened by specific applications.

With continued reference to FIG. 3, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data 304 is accurate because it is signed by TPM 320 whose key may be certified by a CA. Attestation may include a remote attestation. A "remote attestation," as used in this disclosure, is method by which a host (client) authenticates it's hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 320 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. In one or more embodiments, central log may be stored on an immutable sequential listing to prevent tampering of central log. In one or more embodiments, central log may be stored on any immutable sequential listing as described in further detail below.

Figure 4:
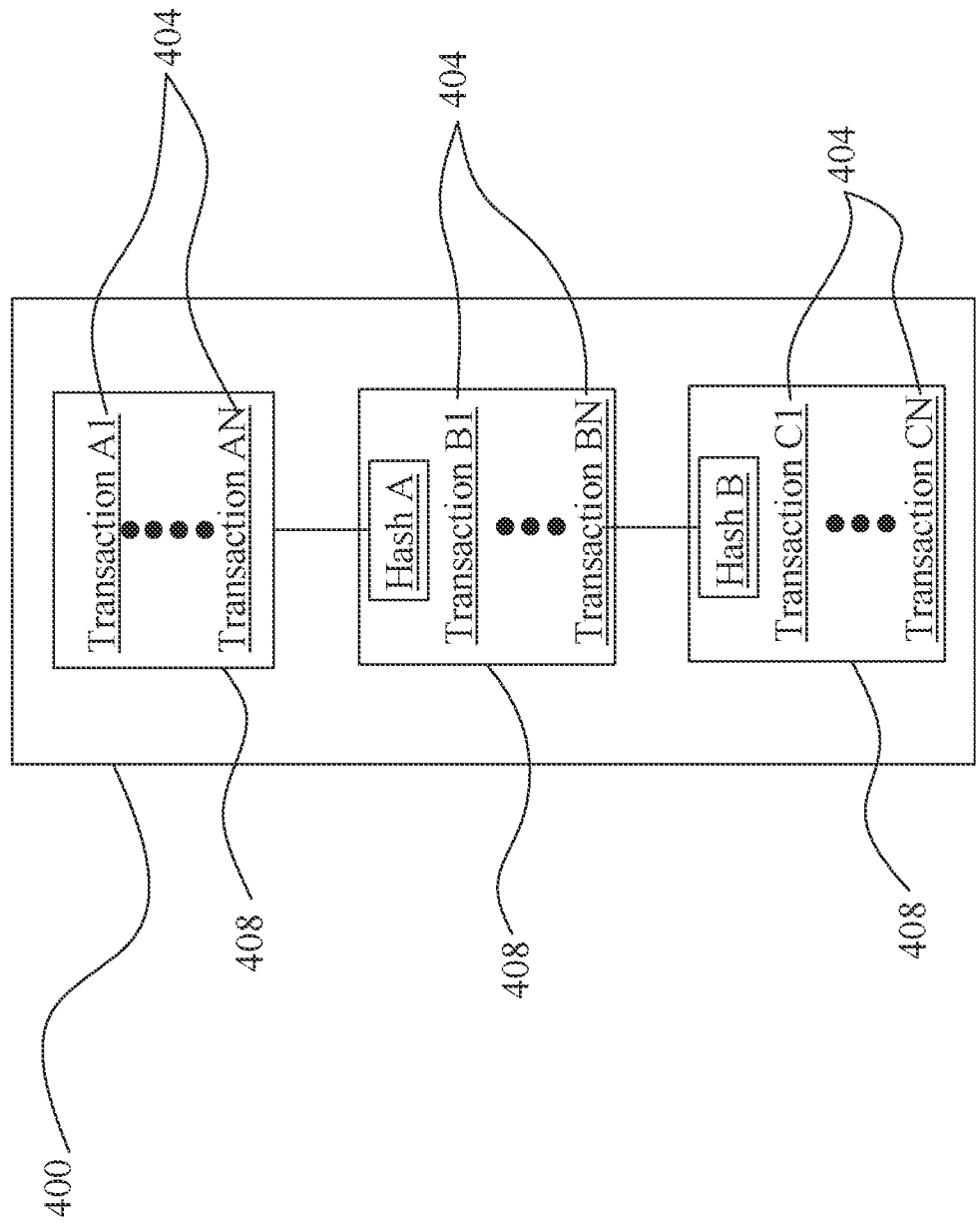
FIG. 4 is an exemplary embodiment of an immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like. Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, a digitally signed assertion 404 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Figure 5:
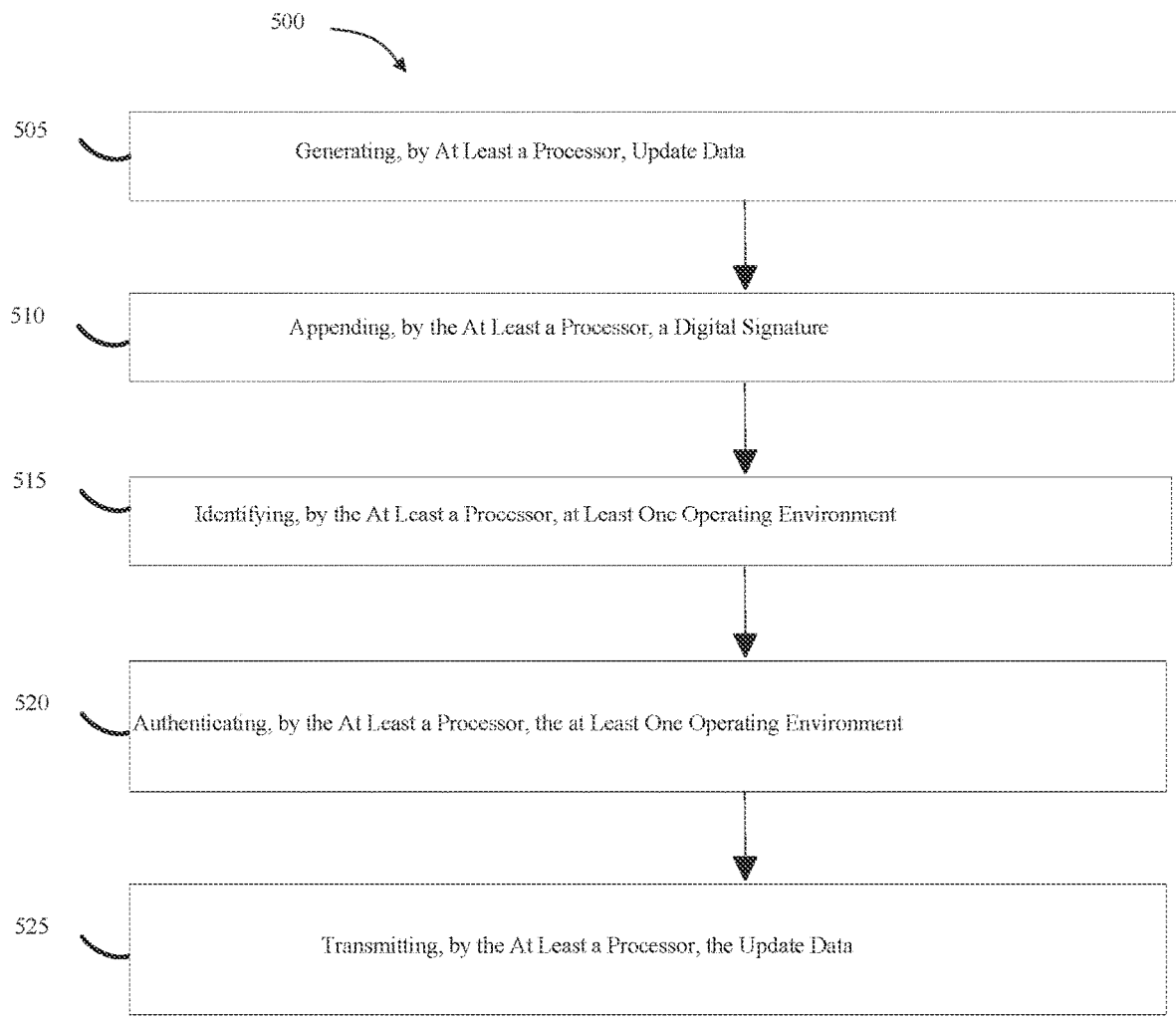
FIG. 5 is a flow diagram illustrating an exemplary embodiment of a method for modification of operating environments.

Referring now to FIG. 5, a method 500 for modification of operating environment is described. at step 505, method 500 includes generating, by at least a processor, update data for one or more operating environments. In one or more embodiments, update data includes modifications to a weapons system. In one or more embodiments, each operating environment includes at least a software container. In one or more embodiments, the update data includes an update for a device driver. This may be implemented with reference to FIGS. 1-4 and without limitation.

With continued reference to FIG. 5, at step 510, method 500 includes appending, by the at least a processor, a digital signature associated with an update data source to the update data. In one or more embodiments, appending, by the at least a processor, the digital signature to the update data includes encrypting the update data using an encryption key. This may be implemented with reference to FIGS. 1-4 and without limitation.

With continued reference to FIG. 5, at step 515, method 500 includes identifying, by the at least a processor, at least one operating environment for receipt of the update data, wherein identification includes determining a compliance of one or more operating environments and identifying the at least one operating environment as a function of the company. In one or more embodiments, determining a compliance of one or more operating environments includes determine a design assurance level classification of the one or more operating environments and identifying the at least one operating environment as a function of the compliance includes identifying at least one operating environment as a function of the design assurance level classification. In one or more embodiments, identifying, by the at least a processor, the at least one operating environment as a function of the design assurance level classification includes comparing a design assurance level classification of the update data to the design assurance level classification of the at least one operating environment. This may be implemented with reference to FIGS. 1-4 and without limitation.

With continued reference to FIG. 5, at step 520, method 500 includes authenticating, by the at least a processor, the at least one operating environment, wherein authentication includes receiving an update log associated with the at least one operating environment and comparing the update log to a central log. In one or more embodiments, comparing the update log to the central log includes comparing the update log to one or more attested timestamps. This may be implemented with reference to FIGS. 1-4 and without limitation.

With continued reference to FIG. 5, at step 525, method 500 includes transmitting, by the at least a processor, update data to the at least one operating environment as a function of the authentication to modify the at least one operating environment. In one or more embodiments, transmitting, by the at least a processor, the update data includes transmitting the update data using delay tolerant networking. In one or more embodiments, transmitting, by the at least a processor, the update data includes dividing the update data into a plurality of data bundles and transmitting each data bundle of the plurality of data bundles to a participating node. In one or more embodiments, transmitting, by the at least a processor, the update data to the at least one operating environment includes receiving an update response and modifying the central log as a function of the update response. This may be implemented with reference to FIGS. 1-4 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
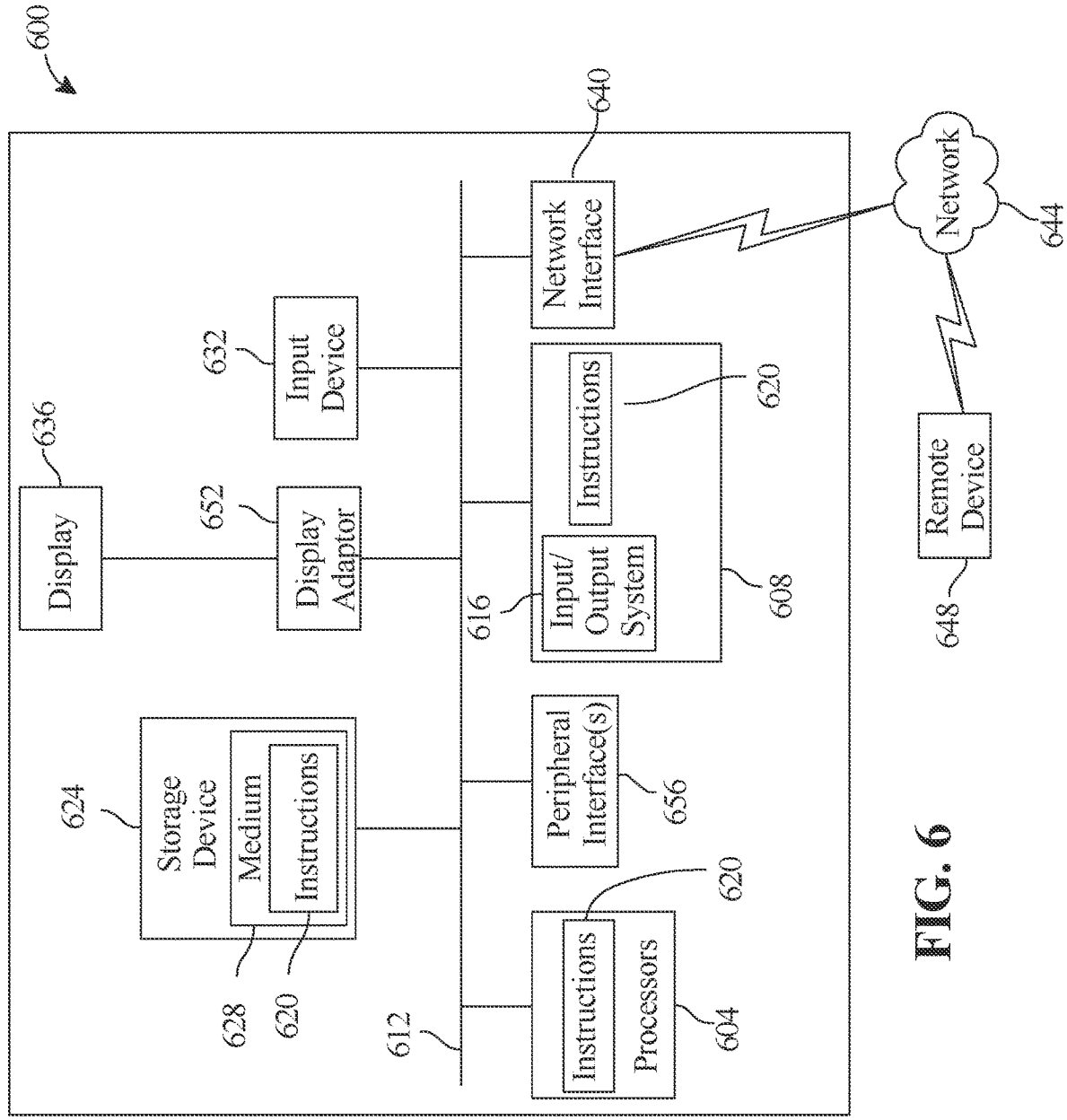
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for modification of operating environments, the apparatus comprising:
at least a processor; and
a memory communicatively connected to the at least a processor, the memory containing instructions configuring the processor to:
generate update data for one or more operating environments;
append a digital signature associated with an update data source to the update data;
identify at least one operating environment for a receipt of the update data, wherein identification comprises:
determining a compliance of one or more operating environments; and
identifying the at least one operating environment as a function of the compliance, wherein identifying the at least one operating environment as a function of the compliance comprises comparing a design assurance level classification of the update data to a design assurance level classification of the at least one operating environment and identifying the at least one operating environment as a function of the comparison;
authenticate the at least one operating environment, wherein authentication comprises:
receiving an update log associated with the at least one operating environment;
comparing the update log to a central log; and
authenticate the at least one operating environment as a function of the comparison; and
transmit the update data to the at least one operating environment as a function of the authentication to modify the at least one operating environment.

2. The apparatus of claim 1, wherein the update data comprises modifications to a weapons system.

3. The apparatus of claim 1, wherein each operating environment of the at least one operating environment comprises a software container.

4. The apparatus of claim 1, wherein appending the digital signature to the update data comprises encrypting the update data using an encryption key.

5. The apparatus of claim 1, wherein comparing the update log to the central log comprises comparing the update log to one or more attested timestamps.

6. The apparatus of claim 1, wherein transmitting the update data comprises transmitting the update data using delay tolerant networking.

7. The apparatus of claim 1, wherein transmitting the update data comprises:
dividing the update data into a plurality of data bundles; and
transmitting each data bundle of the plurality of data bundles to a participating node.

8. The apparatus of claim 1, wherein transmitting the update data to the at least one operating environment comprises:
receiving an update response; and
modifying the central log as a function of the update response.

9. The apparatus of claim 1, wherein the update data comprises an update for a device driver.

10. A method for modification of operating environments, the method comprising:
generating, by at least a processor, update data for one or more operating environments;
appending, by the at least a processor, a digital signature associated with an update data source to the update data;
identifying, by the at least a processor, at least one operating environment for receipt of the update data, wherein identification comprises:
determining a compliance of one or more operating environments; and
identifying the at least one operating environment as a function of the compliance, wherein identifying, by the at least a processor, the at least one operating environment as a function of compliance comprises comparing a design assurance level classification of the update data to a design assurance level classification of the at least one operating environment and identifying the at least one operating environment as a function of the comparison;
authenticating, by the at least a processor, the at least one operating environment, wherein authentication comprises receiving an update log associated with the at least one operating environment and comparing the update log to a central log; and transmitting, by the at least a processor, the update data to the at least one operating environment as a function of the authentication to modify the at least one operating environment.

11. The method of claim 10, wherein the update data comprises modifications to a weapons system.

12. The method of claim 10, wherein each operating environment of the at least one operating environment comprises a software container.

13. The method of claim 10, wherein appending, by the at least a processor, the digital signature to the update data comprises encrypting the update data using an encryption key.

14. The method of claim 10, wherein comparing the update log to the central log comprises comparing the update log to one or more attested timestamps.

15. The method of claim 10, wherein transmitting, by the at least a processor, the update data comprises transmitting the update data using delay tolerant networking.

16. The method of claim 10, wherein transmitting, by the at least a processor, the update data comprises:
dividing the update data into a plurality of data bundles; and
transmitting each data bundle of the plurality of data bundles to a participating node.

17. The method of claim 10, wherein transmitting, by the at least a processor, the update data to the at least one operating environment comprises:
receiving an update response; and
modifying the central log as a function of the update response.

18. The method of claim 10, wherein the update data comprises an update for a device driver.

* * * * *